(12) United States Patent
Nakamura

(10) Patent No.: US 12,529,669 B2
(45) Date of Patent: Jan. 20, 2026

(54) VOID FRACTION SENSOR, FLOWMETER USING THE SAME, AND CRYOGENIC LIQUID TRANSFER PIPE

(71) Applicant: KYOCERA Corporation, Kyoto (JP)

(72) Inventor: Katsumi Nakamura, Koka (JP)

(73) Assignee: KYOCERA Corporation, Kyoto (JP)

( * ) Notice: Subject to any disclaimer, the term of this patent is extended or adjusted under 35 U.S.C. 154(b) by 425 days.

(21) Appl. No.: 18/266,265

(22) PCT Filed: Dec. 9, 2021

(86) PCT No.: PCT/JP2021/045382
§ 371 (c)(1),
(2) Date: Jun. 8, 2023

(87) PCT Pub. No.: WO2022/124376
PCT Pub. Date: Jun. 16, 2022

(65) Prior Publication Data
US 2024/0027387 A1    Jan. 25, 2024

(30) Foreign Application Priority Data

Dec. 9, 2020    (JP) ................................ 2020-204566

(51) Int. Cl.
*G01N 27/22*    (2006.01)
*G01F 1/74*    (2006.01)

(52) U.S. Cl.
CPC ............. *G01N 27/226* (2013.01); *G01F 1/74* (2013.01)

(58) Field of Classification Search
CPC ........ G01N 27/226; G01N 27/22; G01F 1/74; G01F 15/006; G01F 1/86; G01F 1/64; F16L 9/10; F16L 9/22
See application file for complete search history.

(56) References Cited

U.S. PATENT DOCUMENTS

| 4,063,153 A | * | 12/1977 | Dechene | G01N 27/226 324/434 |
| 2010/0011877 A1 | * | 1/2010 | Izumi | G01F 1/586 73/861.12 |

(Continued)

FOREIGN PATENT DOCUMENTS

| CN | 104965010 A | 10/2015 |
| JP | S54-147519 A | 11/1979 |

(Continued)

OTHER PUBLICATIONS

Maeno et al., "Void Fraction Measurement of Cryogenic Two Phase Flow Using a Capacitance Sensor", Trans. JSASS Aerospace Tech. Japan vol. 12, No. ists29, pp. Pa_101-Pa_107, 2014.

*Primary Examiner* — Timothy P Graves
(74) *Attorney, Agent, or Firm* — Procopio, Cory, Hargreaves & Savitch LLP

(57) ABSTRACT

A void fraction sensor for measuring a void fraction of a cryogenic liquid includes a pipe having a conduit in which the cryogenic liquid flows, and an electrode provided on the outer peripheral surface of the pipe to measure capacitance of the cryogenic liquid flowing in the conduit. The pipe is composed of an even number of dividable ceramic members, and among the even number of ceramic members, at least two ceramic members facing each other are each provided with the electrode.

11 Claims, 6 Drawing Sheets

(56) References Cited

U.S. PATENT DOCUMENTS

2018/0052133 A1* 2/2018 Godfrey ................ G01N 27/08
2020/0346984 A1 11/2020 Teramoto

FOREIGN PATENT DOCUMENTS

| | | |
|---|---|---|
| JP | S57-37175 A | 3/1982 |
| JP | H6-241382 A | 8/1994 |
| JP | 2012-91979 A | 5/2012 |
| JP | 2014-232007 A | 12/2014 |
| JP | 2020-173089 A | 10/2020 |
| WO | 2019/044906 A1 | 3/2019 |

* cited by examiner

VOID FRACTION SENSOR, FLOWMETER USING THE SAME, AND CRYOGENIC LIQUID TRANSFER PIPE

TECHNICAL FIELD

The present disclosure relates to a void fraction sensor for measuring a void fraction of a cryogenic liquid such as liquid hydrogen, a flowmeter using the same, and a cryogenic liquid transfer pipe.

BACKGROUND OF INVENTION

With the recent trend of reducing greenhouse gas emissions, the use of hydrogen as a potent energy storage medium has been attracting attention. In particular, liquid hydrogen has a high volumetric efficiency and can be stored for a long period of time, and various techniques for utilizing liquid hydrogen have been developed. However, a method for accurately measuring the flow rate which is required in handling a large volume of liquid hydrogen for industrial use has not been established. A major reason for this is that liquid hydrogen is a fluid which is very easily vaporized and has a large fluctuation of gas-to-liquid ratio that fluctuates largely.

That is, liquid hydrogen is a liquid having an extremely low temperature (boiling point −253° C.) and having very high thermal conductivity and low latent heat, which causes immediate generation of voids. Therefore, in a transfer pipe, liquid hydrogen is in a so-called two-phase flow in which gas and liquid are mixed.

Because of the large fluctuation of the void content percentage, the flow rate of the liquid hydrogen cannot be accurately determined by only measuring the flow velocity in the pipe, as in ordinary liquids, when measuring the flow rate of the liquid hydrogen flowing in the pipe.

In view of the above, a void fraction sensor that measures a void fraction indicating a gas phase volume percentage of the gas-liquid two phase flow is under development. As such a void fraction sensor, Non-Patent Document 1 has proposed a capacitance type void fraction sensor that measures capacitance using a pair of electrodes. The capacitance type void fraction sensor is described as having a structure in which electrodes are attached to an integrally formed pipe made of an acrylic resin or the like from the outside, and the diameter of the pipe is 10.2 mm.

CITATION LIST

Non-Patent Literature

Non-Patent Document 1: Norihide MAENO et al. (5), "Void Fraction Measurement of Cryogenic Two Phase Flow Using a Capacitance Sensor", Trans. JSASS Aerospace Tech. Japan, Vol. 12, No. ists29, pp. Pa_101-Pa_107, 2014

SUMMARY

A void fraction sensor according to the present disclosure measures a void fraction of a cryogenic liquid, and includes a pipe having a conduit through which the cryogenic liquid flows, and an electrode provided on an outer peripheral surface of the pipe to measure capacitance of the cryogenic liquid flowing in the conduit. The pipe is composed of an even number of dividable ceramic members, and among the even number of ceramic members, at least two ceramic members facing each other are each provided with the electrode.

Another void fraction sensor according to the present disclosure includes an inner pipe having a conduit in which a cryogenic liquid flows, an outer pipe covering an outer periphery of the inner pipe, and an electrode disposed outside the inner pipe for measuring a void fraction of the cryogenic liquid flowing in the conduit. The inner pipe is composed of an even number of dividable ceramic members, and among the even number of ceramic members, at least two ceramic members facing each other are each provided with the electrode.

A flowmeter according to the present disclosure measures a flow rate of a cryogenic liquid flowing in a pipe, and includes the void fraction sensor described above, and a flow velocity meter that measures a flow velocity of the cryogenic liquid flowing in the conduit.

The present disclosure also provides a cryogenic liquid transfer pipe provided with the flowmeter described above.

DESCRIPTION OF EMBODIMENTS

Figure 1:
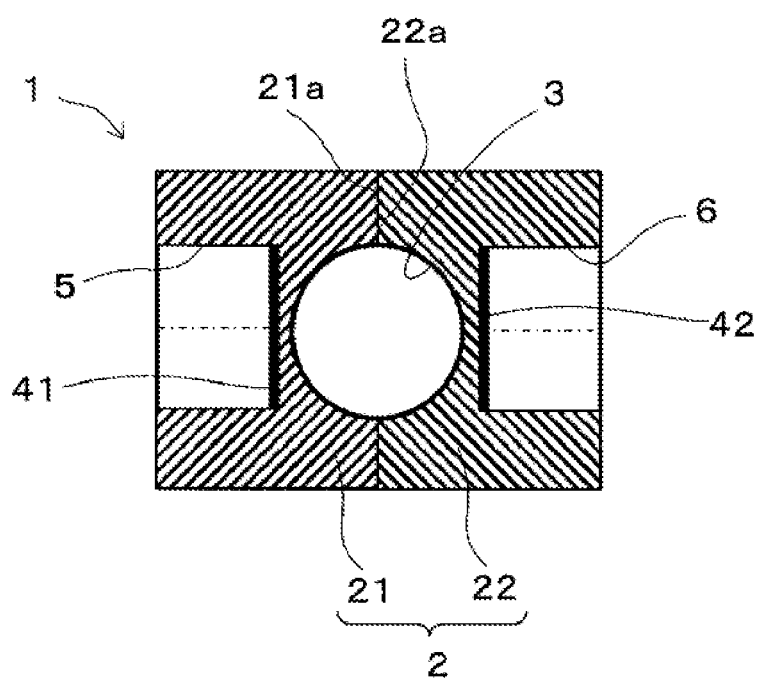
FIG. 1 is a schematic cross-sectional view illustrating a void fraction sensor according to an embodiment of the present disclosure.

Hereinafter, a void fraction sensor according to an embodiment of the present disclosure will be described. In the following description, a void fraction sensor that measures the void fraction when liquid hydrogen is used as a cryogenic liquid will be described. FIG. 1 illustrates a void fraction sensor 1 according to an embodiment of the present disclosure. As illustrated in this drawing, the void fraction sensor 1 according to the present embodiment includes a pipe 2. The pipe 2 is composed of two dividable ceramic members 21 and 22. The liquid hydrogen flows in a conduit 3 in the pipe 2.

In the void fraction sensor that detects a void fraction as a change in capacitance, in order to form an insulator and to reduce the effect of thermal expansion, the pipe 2 is preferably made of a ceramic which has an insulating characteristic and is less susceptible to thermal expansion than a metal. However, it is likely that cracks are generated by thermal shock when the pipe 2 having a large diameter is integrally made of a ceramic and liquid hydrogen is introduced in the pipe as a cryogenic liquid.

In the present disclosure, the pipe 2 is composed of two dividable ceramic members 21 and 22. Therefore, the generation of cracks in the ceramic members 21 and 22 can be suppressed even in an environment where liquid hydrogen flows and, if cracks are generated, extension of the cracks can be suppressed. Therefore, the insulation performance of the ceramic members 21 and 22 can be maintained.

Examples of such ceramic members 21 and 22 include ceramics containing zirconia, alumina, sapphire, aluminum nitride, silicon nitride, sialon, cordierite, mullite, yttria, silicon carbide, cermet, β-eucryptite or the like as a main constituent. When the ceramic members 21 and 22 are made of a ceramic containing alumina as a main constituent, the ceramic may contain an oxide of silicon, calcium, magnesium, sodium, or the like.

The main constituent of a ceramic refers to a constituent accounting for at least 60 mass % out of 100 mass % of all constituents constituting the ceramic. In particular, the main constituent may preferably be a constituent that accounts for at least 95 mass % out of 100 mass % of the constituents constituting the ceramic. The constituents constituting the ceramic may be obtained by using an X-ray diffractometer (XRD). For the content of each constituent, after the constituent is identified, the content of elements constituting the constituent is determined using a fluorescence X-ray analyzer (XRF) or an ICP emission spectrophotometer, and may be converted into the identified constituent.

The inner diameter of the pipe 2 is preferably at least 50 mm. Since the pipe 2 is made of the dividable ceramic members 21 and 22 and the generation and extension of cracks are suppressed, the diameter of the pipe 2 can be increased. This enables mass transportation of liquid hydrogen.

As illustrated in FIG. 1, the outer peripheral side of the pipe 2 includes recessed portions 5 and 6 formed at portions facing each other across the axial center of the conduit 3, and first and second electrodes 41 and 42 are disposed on the bottom surfaces of the recessed portions 5 and 6, respectively, to measure the capacitance. Since the electrodes 41 and 42 are disposed on the bottom surfaces of the recessed portions 5 and 6, the mounting areas and mounting positions of the electrodes 41 and 42 can be determined with high accuracy, thus improving the measurement accuracy of the void fraction of liquid hydrogen.

The recessed portions 5 and 6 and the first and second electrodes 41 and 42 may be disposed over the entire length, or part of the length, of the pipe 2 in the axial direction (which is a direction perpendicular to the surface of the paper in FIG. 1). The bottom surfaces of the recessed portions 5 and 6 are flat surfaces as illustrated in FIG. 1, but the cross sections thereof may be arc-shaped corresponding to the conduit 3.

The electrodes 41 and 42 can be made of, for example, copper foil, aluminum foil, or the like. The electrodes 41 and 42 can be provided on the bottom surfaces of the recessed portions 5 and 6, respectively, by, for example, vacuum evaporation, metallization, or using an active metal method, and the metal plates that serve as the first and second electrodes 3A and 3B may be bonded to the bottom surfaces of the recessed portions 5 and 6, respectively.

The thicknesses of the electrodes 41 and 42 are at least 10 μm, preferably at least 20 μm, and 2 mm or less, preferably 1 mm or less.

The dividable ceramic members 21 and 22 have contact surfaces 21a and 22a, respectively, that are in contact with each other. The contact surfaces 21a and 22a have a mirror finish that enables the contact surfaces 21a and 22a to be closely adhered to each other to suppress leakage of liquid hydrogen flowing in the pipe 2. The mirror finish is provided by, for example, grinding or polishing. The contact surfaces 21a and 22a each preferably have an arithmetic mean roughness (Ra) of, for example, 0.4 μm or less, and preferably 0.2 μm or less.

The arithmetic mean roughness (Ra) can be measured in accordance with JIS B 0601:2001 using a laser microscope (an ultra-deep color 3D profile measuring microscope (VK-X1000 or a successor model thereof) manufactured by KEYENCE CORPORATION). The measurement conditions may be set as follows: the illumination system is coaxial illumination, the measurement magnification is 240×, no cut-off value λs is set, the cut-off value λc is 0.08 mm, the end effect is corrected, and the measurement range is 1425 μm×1067 μm. The surface roughness may be measured by drawing four lines to be measured at substantially equal intervals in the measurement range. The length of a single line to be measured is 1280 μm.

The ceramic members 21 and 22 are overlapped at the contact surfaces 21a and 22a that are in contact with each other, and then an annular body which will be described later may be annularly mounted on the outer peripheral surface to bind the ceramic members 21 and 22.

Figure 2:
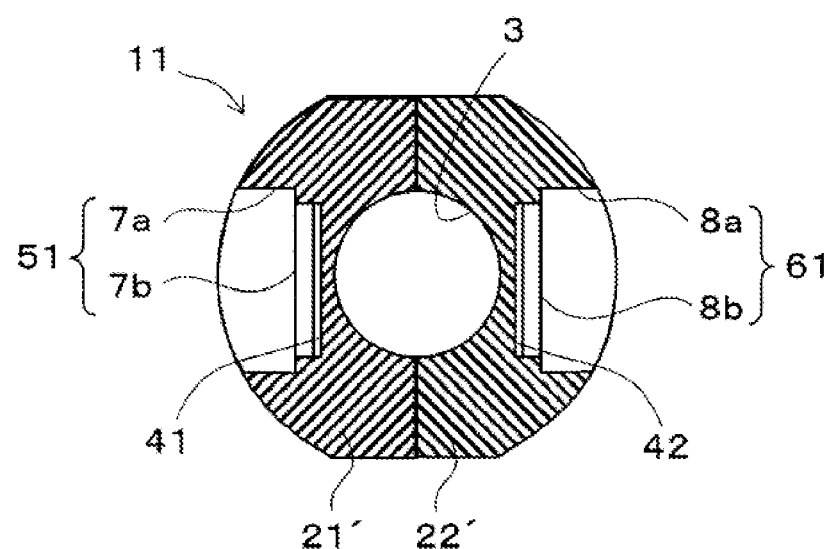
FIG. 2 is a schematic cross-sectional view illustrating a void fraction sensor according to another embodiment of the present disclosure.

FIG. 2 illustrates a void fraction sensor 11 according to another embodiment of the present disclosure. As illustrated in FIG. 2, recessed portions 51 and 61 formed on the outer peripheral sides of ceramic members 21' and 22' have first recessed portions 7a and 8a, respectively, which are open to the outside, and second recessed portions 7a and 8a which are respectively provided on the bottom surfaces of the first recessed portions 7b and 8b. The open areas of the second recessed portions 7b and 8b are smaller than those of the first recessed portions 7a and 8a, and the electrodes 41 and 42 are mounted on the bottom surfaces of the second recessed portions 7b and 8b, respectively. This further improves the positioning accuracy of the electrodes 41 and 42, leading to improvement of the measurement accuracy of the void fraction of liquid hydrogen.

Other portions are the same as the embodiment illustrated in FIG. 1, so that the same constituent members are denoted by the same reference signs, and detailed description thereof will be omitted.

A void fraction sensor according to still another embodiment of the present disclosure will be described with reference to FIGS. 3A and 3B. A void fraction sensor 12 illustrated in FIG. 3A includes an inner pipe 9 having a conduit 31 in which a cryogenic liquid flows, an outer pipe 10 covering the outer periphery of the inner pipe 9, and electrodes 43a, 43b, 43c, and 43d disposed outside the inner pipe 9 to measure the void fraction of the cryogenic liquid flowing in the conduit 31.

Figure 3A:
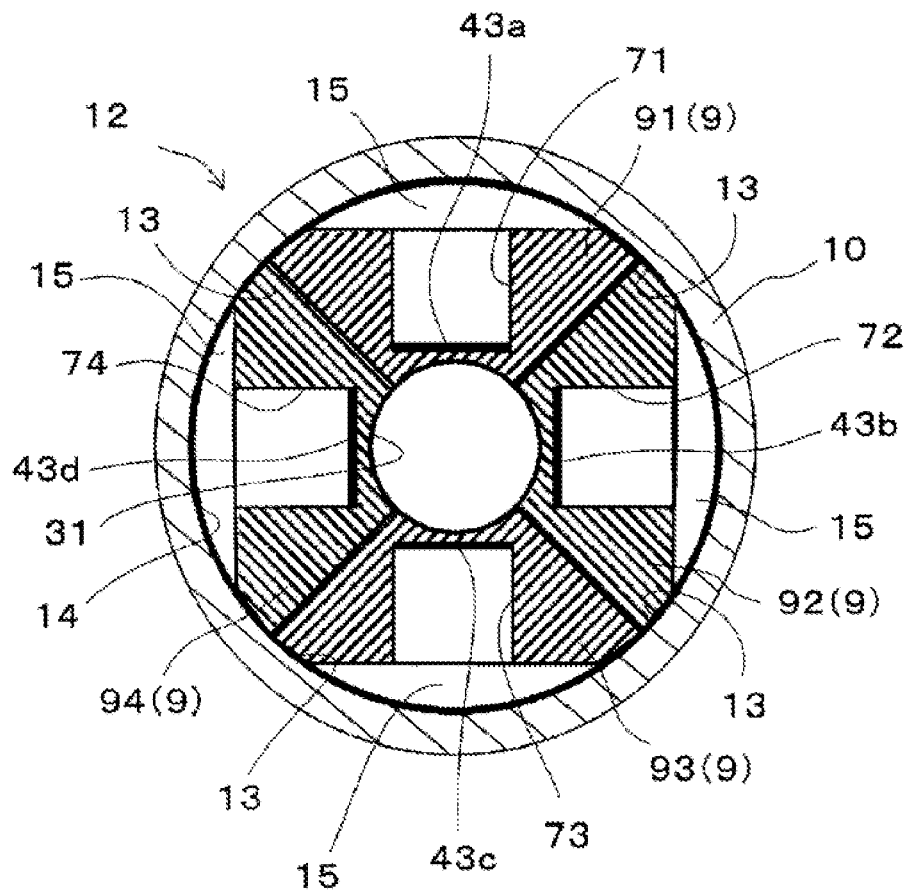
FIG. 3A is a schematic cross-sectional view illustrating a void fraction sensor according to still another embodiment of the present disclosure.
Figure 3B:
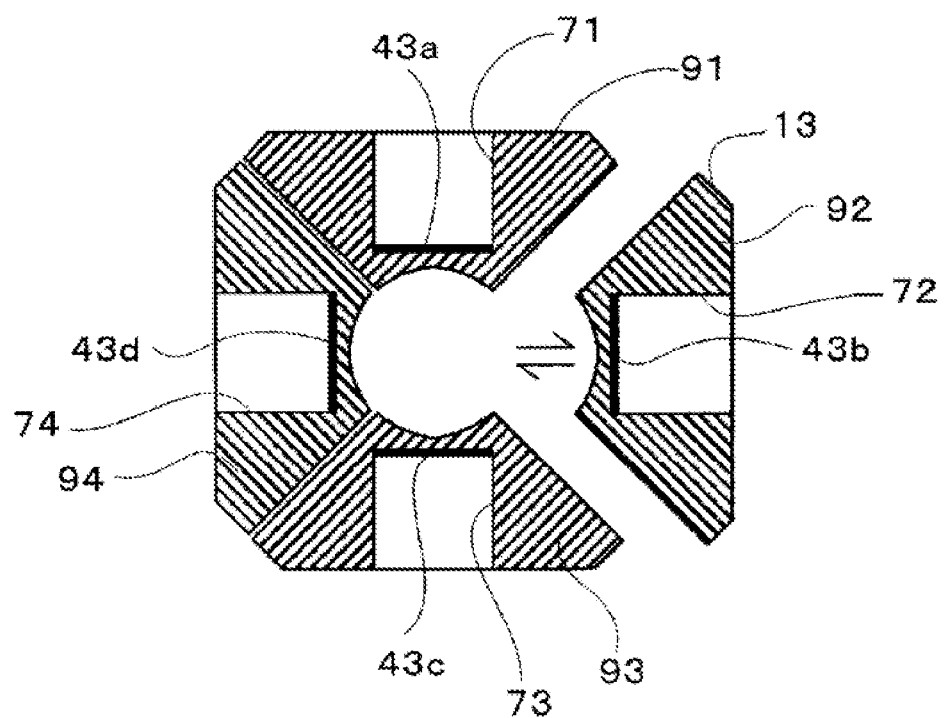
FIG. 3B is an explanatory view illustrating dividable ceramic members illustrated in FIG. 3A.

As illustrated in FIG. 3B, the inner pipe 9 is composed of four dividable ceramic members 91, 92, 93, and 94, and these four ceramic members 91, 92, 93, and 94 have recessed portions 71, 72, 73, and 74, respectively, on the outer peripheral sides thereof, with the recessed portions 71 to 74 provided with the electrodes 43a to 43d, respectively, on the bottom surfaces thereof. The ceramic members 91 to 94 are made of the same material as that of the ceramic members 21 and 22 that constitute the pipe 2.

The outer pipe 10 is made of an austenitic stainless steel such as SUS316, SUS316L, or the like.

The capacitance is measured between the opposing electrodes 43a and 43c and between the opposing electrodes 43b and 43d. To improve the measurement accuracy, the distances between the opposing electrodes 43a and 43c and between the opposing electrodes 43b and 43d are preferably electrically equal.

Figure 4A:
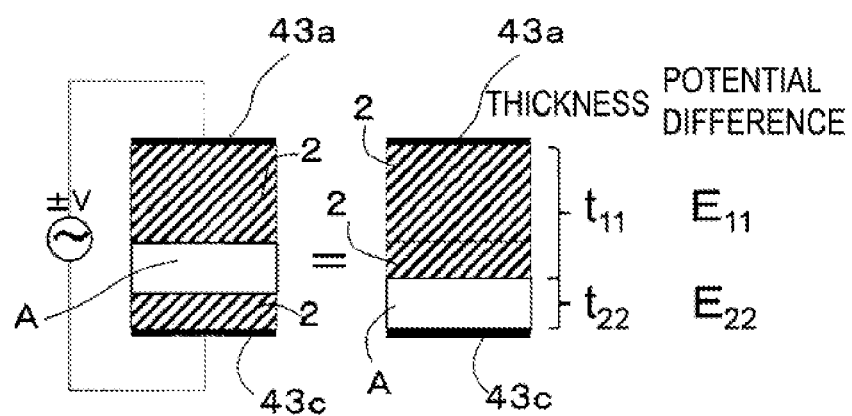
FIGS. 4A and 4B are schematic views for explaining that inter-electrode distances are electrically equal.
Figure 4B:
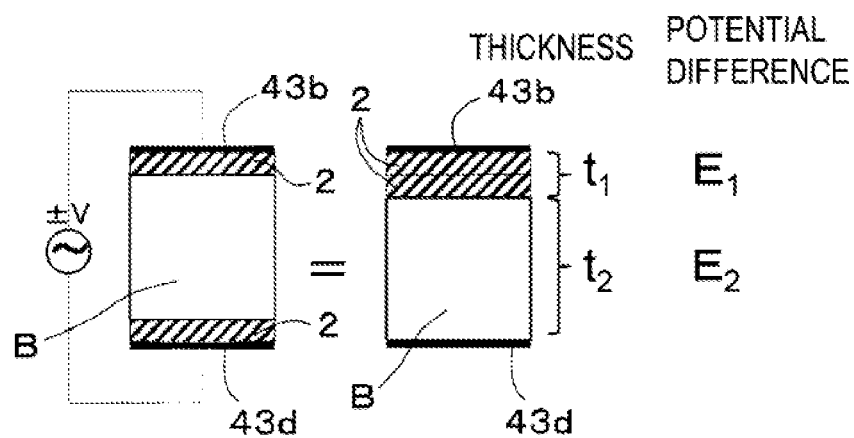

Here, the meaning of "the distances are electrically equal" is described. FIGS. 4A and 4B are schematic views for explaining that inter-electrode distances are electrically equal. FIG. 4A schematically illustrates a thick insulating layer that constitutes the inner pipe 9, and FIG. 4B schematically illustrates a thin insulating layer. In the following description, it is assumed that the total thickness of the inner pipe 9 between the electrodes 43a and 43c is larger than the total thickness of the inner pipe 9 between the electrodes 43b and 43d.

Assume that a potential difference generated according to a total thickness $t_{11}$ of the average thicknesses of the inner pipe 9 sandwiched between the two opposing electrodes 43a and 43c is defined as $E_{11}$, and a potential difference generated according to an average thickness $t_{22}$ of the measurement space A sandwiched between the electrodes 43a and 43c is defined as $E_{22}$. On the other hand, assume that a potential difference generated according to a total thickness $t_1$ of the thicknesses of the inner pipe 9 sandwiched between the opposing two electrodes 43b and 43d is defined as $E_1$, and a potential difference generated according to the thickness $t_2$ of the measurement space B sandwiched between the electrodes 43b and 43d is defined as $E_2$. When $t_{11}$, $t_{22}$, $t_1$ and $t_2$ are adjusted to satisfy $E_2=E_{22}$, this state is referred to as a state in which the inter-electrode distances are electrically equal.

In the example illustrated in FIGS. 4A and 4B, since the total thickness $t_{11}$ of the insulating ceramic, which has a dielectric constant larger than that of the cryogenic liquid, is greater than the thickness $t_1$, the average thickness $t_{22}$ of the measurement space A is smaller than the thickness $t_2$ of the measurement space B. The potential differences $E_1$, $E_{22}$, $E_1$, and $E_2$ can be measured by a capacitance measuring device.

The average thicknesses of the inner pipe 9 sandwiched between the electrodes 43a and 43c and between the electrodes 43b and 43d can be determined using the mean value theorem of integration. The average thickness $t_{22}$ of the measurement space A sandwiched between the electrodes 43a and 43c is a value obtained by subtracting the total thickness $t_{11}$ of the average thicknesses of the inner pipe 9 sandwiched between the electrodes 43a and 43c from the distance between the electrodes 43a and 43c. The average thickness $t_2$ of the measurement space B sandwiched between the electrodes 43b and 43d can be obtained in the same manner.

In FIG. 3A, the inner pipe 9 has a substantially quadrangular cross section, and corner portions 13 thereof are chamfered or rounded. An annular body 14 for binding the ceramic members 91 to 94 is attached around the outer peripheral surface of the inner pipe 9. Examples of the annular body 14 include a strip-shaped flexible plastic film, and a metal strip. In such cases, the annular body 14 is bonded at both ends thereof by bonding means such as thermal fusion or welding.

As illustrated in FIG. 3A, the chamfered corner portions 13 press-bonded substantially uniformly by the annular body 14 to firmly bind the ceramic members 91 to 94.

The inner peripheral surface of the inner pipe 9 may be a ground surface. The inner peripheral surface of the inner pipe 9 composed of a ground surface can achieve better geometric tolerances such as roundness and cylindricity than those of a fired surface, thus improving the measurement accuracy of the void fraction.

The outer pipe 10 is externally fitted over the outer periphery of the inner pipe 9 bound by the annular body 14 to cover the outer periphery of the inner pipe 9. At this time, a gap 15 is formed between the inner pipe 9 and the outer pipe 10. By reducing the pressure in the gap 15, a heat insulating structure is formed as in a vacuum insulated pipe, suppressing vaporization of liquid hydrogen by heat and improving the measurement accuracy of the void fraction. The vacuum degree in the gap 15 is, for example, from 0.1 Pa to 100 Pa.

The relative density of the ceramic members is, for example, from 92% to 99.9%. The relative density is expressed as a percentage (ratio) of the apparent density of the ceramic member which is determined in accordance with JIS R 1634-1998 concerning the theoretical density of ceramic members.

At least one of the ceramic members includes closed pores, and a value obtained by subtracting an average value of the equivalent circle diameters of the closed pores from an average value of the distances between centers of gravity of adjacent closed pores may be from 8 µm to 18 µm (this value will hereinafter be referred to as the distance between the closed pores). The closed pores are independent of each other.

When the interval between the closed pores is 8 µm or greater, the closed pores are present in a relatively dispersed manner which increases mechanical strength. When the interval between the closed pores is 18 µm or less, even if a microcrack originating from the contour of a closed pore occurs due to repeated cold thermal shocks, the likelihood of the extension of the microcrack being blocked is high due to the surrounding closed pores. This means that the ceramic member having the interval between the closed pores from 8 µm to 18 µm can be used over a long period of time.

The skewness of the equivalent circle diameter of the closed pores may be larger than the skewness of the distance between the centers of gravity of the closed pores. The skewness Sk is an index (a statistic) indicating how much a distribution is distorted from the normal distribution. That is, the skewness indicates the bilateral symmetry of the distribution. When the skewness is greater than 0, the tail of the distribution extends to the right. When the skewness is 0, the distribution is bilaterally symmetrical. When the skewness is less than 0, the tail of the distribution extends to the left.

Overlapping histograms of the equivalent circle diameter and the distance between the centers of gravity of the closed pores indicate that the mode value of the equivalent circle diameter is located on the left side (zero side) of the mode value of the distance between the centers of gravity of the closed pores, when the skewness of the equivalent circle diameter is larger than the skewness of the distance between the centers of gravity. This means that many closed pores with small equivalent circle diameters are present and such closed pores are present sparsely, so that the ceramic member having both mechanical strength and thermal shock resistance can be obtained.

For example, the skewness of the equivalent circle diameter of the closed pores is 1 or greater, and the skewness of the distance between the centers of gravity of the closed pores is 0.6 or less. The difference between the skewness of the equivalent circle diameter of the closed pores and the skewness of the distance between the centers of gravity of the closed pores is 0.4 or greater.

To determine the distance between the centers of gravity and the equivalent circle diameter of the closed pores, the ceramic member is polished on a copper disk using diamond abrasive grains having an average grain diameter $D_{50}$ of 3 µm from one end surface of the ceramic member along the axial direction. Subsequently, polishing is performed on a tin disk using diamond abrasive grains having an average grain diameter $D_{50}$ of 0.5 µm to obtain a polished surface having an arithmetic mean roughness (Ra) of 0.2 µm or less in the roughness curve. The arithmetic mean roughness Ra of the polished surface is the same as that in the method described above.

The polished surface is observed at 200× magnification and, with an average area selected, an area of, for example, $7.2 \times 10^4$ μm$^2$ (horizontal length 310 μm by vertical length 233 μm) is captured with a CCD camera to obtain an observation image.

The distance between the centers of gravity of the closed pores can be determined for this observation image, for example, with the image analysis software "A zou-kun (ver 2.52)" (trade name of Asahi Kasei Engineering Corporation), using a method called a distance between centers of gravity method for dispersion measurement. Hereinafter, the term image analysis software "A zou-kun" refers to the image analysis software manufactured by Asahi Kasei Engineering Corporation throughout the description.

For example, the setting conditions for this method can be as follows: the threshold is 165 which is used as a measure of image brightness/darkness, the brightness level is set to dark, the small figure removal area is 1 μm$^2$, and no noise reduction filter is set. The threshold can be adjusted according to the brightness of the observation image. The brightness level is set to dark, the binarization method is set to manual, the small figure removal area is set to 1 μm$^2$, and the noise removal filter is set. Then, the threshold can be adjusted so that a marker appearing in the observation image matches the shape of the closed pore. For the equivalent circle diameter of the closed pores, a particle analysis method is used to determine the equivalent circle diameter of the open pores by using the observation image as a target. The setting conditions for this method may be the same as the setting conditions for calculating the distance between the centers of gravity of the closed pores.

The skewness of the equivalent circle diameter and the distance between the centers of gravity of the closed pores can be calculated using the Skew function provided in Excel (trade name of Microsoft Corporation).

An example of a method for manufacturing the ceramic member is described. The ceramic member made of a ceramic containing alumina as the main constituent is described.

The main constituent of aluminum oxide powder (purity of at least 99.9 mass %) is put into a pulverizing mill with powders of magnesium hydroxide, silicon oxide, and calcium carbonate, and a solvent (for example, ion-exchanged water). The mixture is pulverized until an average grain diameter $D_{50}$ of the powders is 1.5 μm or less. Subsequently, an organic binder and a dispersing agent for dispersing the aluminum oxide powder are added and mixed to obtain a slurry.

Of the total of 100 mass % of the powders described above, the content of magnesium hydroxide powder is from 0.3 to 0.42 mass %, the content of silicon oxide powder is from 0.5 to 0.8 mass %, the content of calcium carbonate powder is from 0.06 to 0.1 mass %, and the remainder includes aluminum oxide powder and incidental impurities.

The organic binder is an acrylic emulsion, polyvinyl alcohol, polyethylene glycol, polyethylene oxide, or the like.

Subsequently, the slurry is spray-granulated to obtain granules which are then pressurized at a molding pressure from 78 MPa to 118 MPa using a uniaxial press molding device or a cold isostatic press molding device to obtain a columnar powder compact. The powder compact is cut, if necessary, to form a recess which becomes a recessed portion after firing.

Subsequently, the powder compact is burned at a burning temperature of from 1580° C. to 1780° C. and a retention time of 2 hours to 4 hours to obtain a ceramic member.

To obtain a ceramic member having an interval between closed pores of from 8 μm to 18 μm, the firing temperature is set to 1600° C. to 1760° C. and the retention time is set to 2 hours to 4 hours to fire the powder compact. The surface of the ceramic member facing the conduit 3 or 31 may be ground to form a ground surface. A surface of the recessed portion on which the electrode is provided may be ground to form a bottom surface.

In the present disclosure, the inner pipe has a cross section not limited to a substantially quadrangular shape, and the cross-sectional shape may be a circular shape or another polygonal shape. In that case, for example, an even number of two, four, six, or eight ceramic members are provided to constitute the inner pipe. This is because a pair of opposing electrodes is required to measure the capacitance, and each electrode is attached to a respective ceramic member.

All of the even number of ceramic members need not be provided with electrodes. Alternatively, at least two opposing ceramic members may each be provided with an electrode.

As described above, according to the present disclosure, since the pipe 2 or the inner pipe 9 is composed of an even number of dividable ceramic members, the generation and extension of the cracks that are likely to be generated in the ceramic members can be suppressed even in an environment where cryogenic liquid flows, thus maintaining electrical function. Therefore, the void fraction sensor of the present disclosure has excellent durability and high reliability.

The flowmeter according to the embodiments of the present disclosure is described. The flowmeter measures the flow rate of the liquid hydrogen flowing in the conduit 3 or 31, and includes the void fraction sensor 1, 11, or 12, and a flow velocity meter which is not illustrated. The void fraction sensor 1, 11, or 12 and the flow velocity meter are attached to a liquid hydrogen transfer pipe which is not illustrated (hereinafter may be referred to as a transfer pipe). The flow velocity meter measures the flow velocity at which the cryogenic liquid flows in the conduit 3 or 31.

Since the liquid hydrogen flowing in the conduit 3 or 31 is a two-phase flow mixing gas and liquid, the void fraction sensor 1, 11, or 12 measures the void fraction, from which a density d (kg/m$^3$) of the liquid hydrogen is obtained. This is because the density d of liquid hydrogen corresponds to a relative permittivity and also to the capacitance measured by the void fraction sensor 1 or 11.

Accordingly, the flow rate F (kg/s) is determined by the following equation, where v is the flow velocity (m/s) of the liquid hydrogen determined by the flow velocity meter, and a is the cross-sectional area (m$^2$) of the conduit 3 or 31.

$$F = d \times v \times a$$

To calculate this equation, the flowmeter may further include a computing device to which the void fraction sensor 1 or 11 and the flow velocity meter are connected. This facilitates the measurement of the flow rate of the liquid hydrogen, leading to easier control when transferring a large amount of liquid hydrogen for industrial use.

The void fraction sensors 1, 11, and 12 for liquid hydrogen and the flowmeter using the same have been described above, but the present disclosure can be similarly applied to other cryogenic liquids, such as liquid nitrogen (−196° C.), liquid helium (−269° C.), liquefied natural gas (−162° C.), liquid argon (−186° C.) and the like (where the values in parentheses indicate the liquefaction temperature). Therefore, the cryogenic liquid in the present disclosure is a liquid that is liquefied at a cryogenic temperature of −162° C. or lower.

Although the preferred embodiments of the present disclosure have been described above, the void fraction sensor of the present disclosure is not limited thereto, and various changes and improvements can be made within the range set forth in the present disclosure.

REFERENCE SIGNS 1, 11, 12 Void fraction sensor
2 Pipe
3, 31 Conduit
5, 6, 51, 61 Recessed portion
6A, 6B Recessed portion
7a, 8a First recessed portion
7b, 8b Second recessed portion
9 Inner pipe
10 Outer pipe
13 Corner portion
14 Annular body
15 Gap
21, 22, 91, 92, 93, 94 Ceramic member
21a, 22a Contact surface
41, 42 43a, 43b, 43c, 43d Electrode
71, 72, 73, 74 Recessed portion

The invention claimed is:

1. A void fraction sensor for measuring a void fraction of a cryogenic liquid, comprising:
a pipe having a conduit in which the cryogenic liquid flows; and
an electrode provided on an outer peripheral side of the pipe to measure capacitance of the cryogenic liquid flowing in the pipe, wherein
the pipe is composed of an even number of ceramic members that are dividable, and among the even number of ceramic members, at least two ceramic members facing each other are each provided with the electrode.

2. The void fraction sensor according to claim 1, wherein each of the ceramic members has, on an outer peripheral surface thereof, a recessed portion which is open to an outside, and the electrode is mounted on a bottom surface of the recessed portion.

3. The void fraction sensor according to claim 2, wherein the recessed portion comprises a first recessed portion which is open to the outside and a second recessed portion provided on a bottom surface of the first recessed portion,
the second recessed portion has an open area smaller than an open area of the first recessed portion, and
the electrode is mounted on a bottom surface of the second recessed portion.

4. The void fraction sensor according to claim 1, wherein
at least one of the ceramic members has closed pores, and
a value obtained by subtracting an average value of equivalent circle diameters of the closed pores from an average value of distances between centers of gravity of adjacent closed pores is from 8 µm to 18 µm.

5. The void fraction sensor according to claim 4, wherein
a skewness of the equivalent circle diameters of the closed pores is larger than a skewness of the distances between the centers of gravity of the adjacent closed pores.

6. A flowmeter comprising:
the void fraction sensor according to claim 1; and
a flow velocity meter that measures a flow velocity of the cryogenic liquid flowing in the conduit, wherein
the flowmeter measures a flow rate of the cryogenic liquid flowing in the conduit of the pipe.

7. A cryogenic liquid transfer pipe comprising:
the flowmeter according to claim 6.

8. A void fraction sensor for measuring a void fraction of a cryogenic liquid, comprising:
an inner pipe having a conduit in which the cryogenic liquid flows;
an outer pipe covering an outer periphery of the inner pipe; and
an electrode disposed outside the inner pipe for measuring the void fraction of the cryogenic liquid flowing in the conduit, wherein
the inner pipe is composed of an even number of dividable ceramic members, and among the even number of ceramic members, at least two ceramic members facing each other are each provided with the electrode.

9. The void fraction sensor according to claim 8, wherein
a depressurized gap is provided between the inner pipe and the outer pipe.

10. The void fraction sensor according to claim 8, wherein:
an annular body that binds the ceramic members is mounted on the outer periphery of the inner pipe.

11. The void fraction sensor according to claim 8, wherein
an inner peripheral surface of the inner pipe is a ground surface.

\* \* \* \* \*